No. 834,731. PATENTED OCT. 30, 1906.
H. JAPP.
CALKING MATERIAL.
APPLICATION FILED DEC. 2, 1905.

WITNESSES
INVENTOR
Henry Japp
BY
ATTORNEYS

UNITED STATES PATENT OFFICE.

HENRY JAPP, OF NEW YORK, N. Y., ASSIGNOR TO S. PEARSON & SON, INC., OF LONG ISLAND CITY, NEW YORK, A CORPORATION OF NEW YORK.

CALKING MATERIAL.

No. 834,731.  Specification of Letters Patent.  Patented Oct. 30, 1906.

Application filed December 2, 1905. Serial No. 289,959.

*To all whom it may concern:*

Be it known that I, HENRY JAPP, a subject of the King of Great Britain and Ireland, and a resident of the borough of Manhattan, in the city, county, and State of New York, have invented certain new and useful Improvements in Calking Material, of which the following is a specification.

My invention relates to calking or rusting material more especially adapted to be inserted in the joints between the iron or steel segments with which tunnels are lined—such, for example, as the style illustrated and described in Patent No. 794,635, dated July 11, 1905. For the purpose of making a rust joint between these segments or other joints a mixture of iron machinings or filings and sal-ammoniac substantially in the proportion of four hundred to one is commonly used. The operation of packing this loose material in the joints, especially where they are overhead, is a very difficult, tedious, and expensive one.

It is the object of this invention to meet this difficulty and to so construct the calking or rusting material as to facilitate the calking operation. This object I attain by compressing the material into a cake of suitable size and shape to be conveniently handled and introduced into the joints and pressed to make a tight joint.

Figure 1:
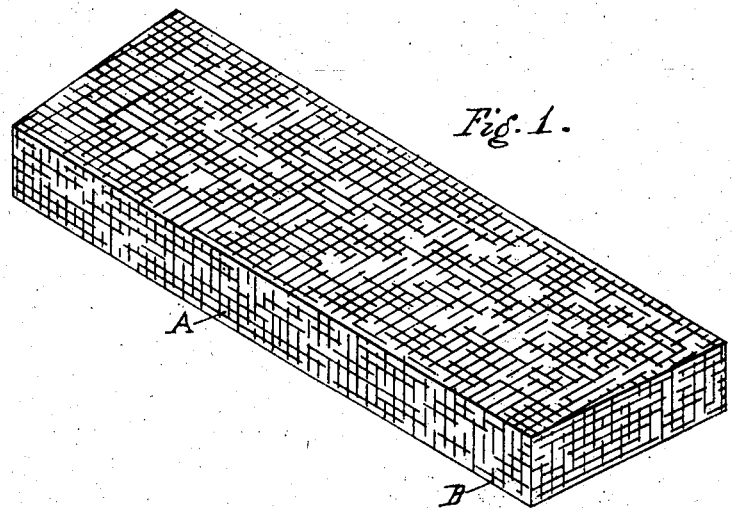
Figure 2:

In the accompanying drawings, Figure 1 is a perspective view of a preferred form of cake, and Fig. 2 is a transverse section of the same.

Referring to the drawings, A represents the calking material, which is formed into a cake of substantially the size and shape desired. In order that it will retain its shape better and be more cohesive, I incorporate in the material means for holding it in shape. In the drawings I have illustrated a piece of netting B, preferably iron mosquito-netting or the like, wrapped around the cake. The whole is put into a mold and compressed into a cake or cartridge slightly thinner than the joint into which it is to be inserted. When the rusting-cake thus made is put into place and the joint calked, the iron or steel netting becomes more thoroughly incorporated with the rusting material and the fine iron filings and the moisture of the sal-ammoniac are forced through the meshes and come into intimate contact with the sides of the segments, thereby efficiently making a rust joint.

In the form shown in Fig. 1 it will be noted that the ends of each cake are slightly beveled in order that the cakes when placed end to end will more readily accommodate themselves to the curvature of the tunnel-lining for the circumferential joints.

It is obvious that the shape may be varied and the cake be used for calking joints and cracks in any iron or steel structure where a rust joint is required.

I claim as my invention—

1. As a new article of manufacture, a compressed cake of rusting material for calking the joints in tunnel-linings and the like.

2. As a new article of manufacture, a compressed cake of rusting material for calking the joints in tunnel-linings and the like, in combination with means incorporated with the rusting material for retaining its shape.

3. As a new article of manufacture, a compressed cake of rusting material for calking the joints in tunnel-linings and the like, with a netting inclosing said cake.

4. As a new article of manufacture, a compressed cake of rusting material for calking the joints in tunnel-linings and the like, with an iron or steel netting inclosing said cake.

In testimony whereof I have signed my name to this specification in the presence of two subscribing witnesses.

HENRY JAPP.

Witnesses:
   JOHN M. ABBOTT,
   GEORGE MEGISON.